US 6,647,955 B1

United States Patent
Sieber

(10) Patent No.: US 6,647,955 B1
(45) Date of Patent: Nov. 18, 2003

(54) METHOD OF GRADUAL STOPPING CONTROL OF AN INTERNAL COMBUSTION ENGINE

(75) Inventor: Udo Sieber, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,751
(22) PCT Filed: Nov. 10, 2000
(86) PCT No.: PCT/DE00/04013
§ 371 (c)(1), (2), (4) Date: Jan. 18, 2002
(87) PCT Pub. No.: WO01/44636
PCT Pub. Date: Jun. 21, 2001

(30) Foreign Application Priority Data

Dec. 17, 1999 (DE) .......................... 199 60 984

(51) Int. Cl.⁷ .................. F02D 13/04; F02D 41/06; F01L 9/04
(52) U.S. Cl. ................ 123/322; 123/90.15; 123/179.3; 123/32
(58) Field of Search ............... 123/90.15, 321, 123/322, 179.1, 179.3, 179.5

(56) References Cited

U.S. PATENT DOCUMENTS

| 4,009,695 A | * | 3/1977 | Ule ...................... 123/179.5 X |
| 5,074,263 A | * | 12/1991 | Emerson .................. 123/179.5 |
| 5,255,650 A | | 10/1993 | Faletti et al. ................ 123/322 |
| 5,687,682 A | * | 11/1997 | Rembold et al. ........ 123/179.3 |
| 6,062,186 A | * | 5/2000 | Barnes et al. ............ 123/179.3 |
| 6,098,585 A | * | 8/2000 | Brehob et al. ........... 123/179.5 |
| 6,453,864 B1 | * | 9/2002 | Downs et al. ........... 123/179.3 |

FOREIGN PATENT DOCUMENTS

| DE | 39 32 072 | 4/1990 |
| DE | 197 41 294 | 3/1999 |
| EP | 1 074 713 | 2/2001 |

* cited by examiner

Primary Examiner—Tony M. Argenbright
(74) Attorney, Agent, or Firm—Kenyon & Kenyon

(57) ABSTRACT

A desired gradual stopping position of a piston in at least one cylinder of an internal combustion engine can be attained very accurately and simply by closing the gas exhaust valves of one or more cylinders of an internal combustion engine for one or more time segments after the ignition has been turned off, the beginning and the end of each valve closing segment being controlled so that the crankshaft comes to a stop in the desired stopping position.

6 Claims, 1 Drawing Sheet

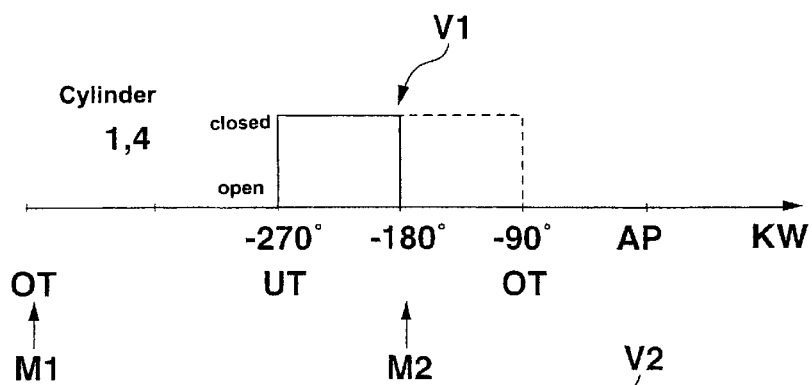
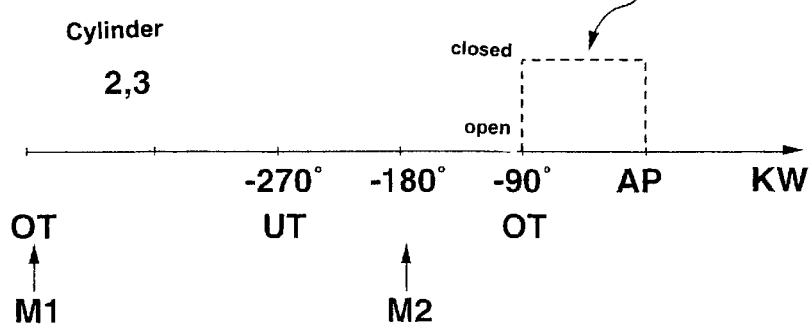
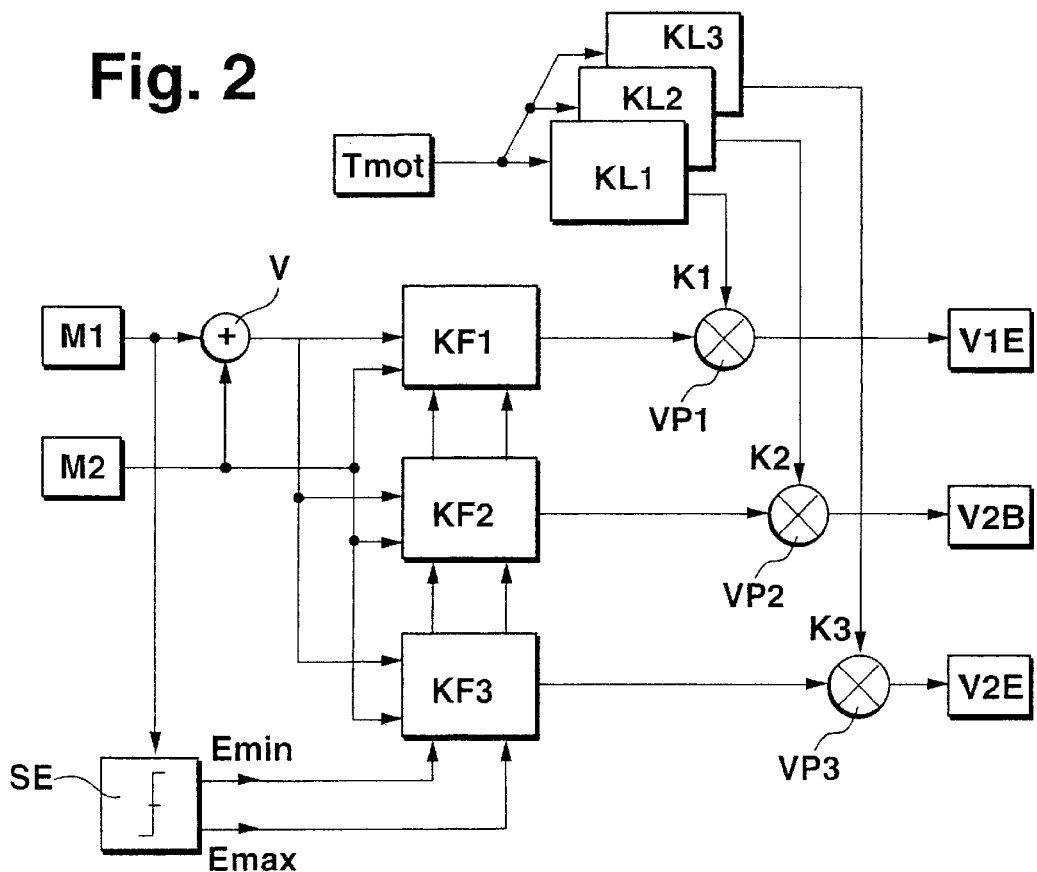

ID OF THE INVENTION

The present invention relates to a method of gradual stopping control of an internal combustion engine, the piston in at least one cylinder of the engine being brought into a specific position which corresponds to an angular position of the crankshaft clearly located after the top dead center.

BACKGROUND INFORMATION

In internal combustion engines having internal direct start, in which the engine itself is used as a start motor, the piston in at least one cylinder must be in a position that is clearly after the top dead center. If fuel is subsequently injected into the cylinder and ignited, the resulting combustion torque is sufficient to start the engine. For such a direct start internal combustion engine, German Published Patent Application No. 197 41 294 proposes that in order to start the engine the crankshaft be brought into a predefined start position using an electric motor, so that the fuel injected into a start cylinder is ignited when the crankshaft start position is attained. Furthermore, this German Published Patent Application No. 197 41 294 also mentions that the piston position required for direct start can be set in at least one cylinder in a controlled manner as early as during the gradual stopping of the crankshaft. The above-named document does not describe the arrangement or the method whereby this specific stopping position can be achieved.

SUMMARY OF THE INVENTION

An object of the present invention is to provide a method of gradual stopping control of an internal combustion engine of the aforementioned type where the piston in at least one cylinder can be brought into a specific position during a gradual stopping of the internal combustion engine which allows direct start of the engine.

This object is achieved by the fact that the gas exhaust valves of one or more cylinders of the internal combustion engine are closed for one or more time segments after the ignition has been turned off, the beginning and the end of each valve closing segment being controlled so that the crankshaft remains in the desired stopping position. According to the present invention, in an internal combustion engine equipped with variable valve control, this valve control can also be used for gradual stopping control of the engine without the need for an additional arrangement.

According to the present invention, in a first method step, after the ignition has been turned off, the rotational speed of the crankshaft is measured after a predefined number of crankshaft revolutions as it passes through the top dead center. In a second method step, the gas exchange valves of the at least one cylinder are closed at the subsequent bottom dead center for a first valve closing segment. In a third method step, the rotational speed of the crankshaft is measured again as it passes through a predefined angular position after the bottom dead center. In a fourth method step, the end of the first valve closing segment is determined as a function of the two measured values of the rotational speed of the crankshaft. In the last method step, in the event of a rotational speed of the crankshaft, measured at the top dead center, corresponding to a maximum value of the kinetic energy, the gas exchange valves of at least one additional cylinder are closed for a second valve closing segment, the times of closing and opening of these gas exchange valves being determined as a function of the two measured values of the crankshaft rotational speed.

It is advantageous to read the end of the first valve closing segment from a first characteristic map, the beginning of the second valve closing segment from a second characteristic map, and the end of the second valve closing segment from a third characteristic map as a function of the difference of the two measured values of the rotational speed and the rotational speed of the crankshaft measured after the bottom dead center.

In a preferred embodiment, the first valve closing segment is terminated at an angular position of the crankshaft of 180° before the predefined stopping position if the rotational speed measured at the top dead center corresponds to a minimum value of the kinetic energy, and the first valve closing segment is terminated at an angular position of the crankshaft of 90° before the predefined stopping position if the rotational speed measured at the top dead center corresponds to a maximum value of the kinetic energy.

The second valve closing segment is advantageously begun in an angular position of the crankshaft of 90° before the predefined stopping position and terminated in an angular position in the proximity of the stopping position if the rotational speed of the crankshaft measured at the top dead center corresponds to a maximum value of the kinetic energy.

It is advantageous to correct the beginning and ending points of the valve closing segments output by the characteristic maps using correction values taken from characteristic curves as a function of the engine temperature.

BRIEF DESCRIPTION OF THE DRAWINGS

FIG. 1a is a first illustration showing the valve positions of four cylinders during the gradual stopping of an internal combustion engine.

FIG. 1b is a second illustration showing the valve positions of four cylinders during the gradual stopping of an internal combustion engine.

FIG. 2 shows a function diagram for gradual stopping control of an internal combustion engine.

DETAILED DESCRIPTION

The gradual stopping control principle on which the present invention is based is described below using the example of an internal combustion engine having four cylinders. For example, in order to bring the pistons in cylinders 1 and 4 into a specific position after the ignition has been turned off, which corresponds, for example, to an angular position of the crankshaft of 90° after the top dead center OT, the gas exchange valves (admission and exhaust valves) are closed and opened again according to a certain mode illustrated in FIGS. 1a and 1b. The function diagram in FIG. 2 shows how the individual gas exhaust valves are activated so that the pistons, for example, in cylinders 1 and 4 come to a stop in the desired position. In FIGS. 1a and 1b, in which valve closing segments V1 and V2 of cylinders 1, 4 and cylinders 2, 3 are plotted against crankshaft angle KW, the desired stopping position is labeled AP and is located there in an angular position of the crankshaft of 90° after the top dead center OT.

The procedure for controlling the gradual stopping of the internal combustion engine begins by measuring the rotational speed of the crankshaft after the ignition has been turned off and after a predefined number of crankshaft revolutions as the crankshaft passes through top dead center OT. This measured value of the rotational speed is labeled M1 in FIGS. 1a, 1b, and 2. Crankshaft angle KW and rotational speed M1 of the crankshaft are determined in a known manner (see, for example, German Published Patent Application No. 39 32 072) using a code wheel located on the crankshaft. At bottom dead center UT, following top dead center OT in which first measured value M1 of the rotational speed is determined, the gas exchange valves of cylinders 1 and 4 are closed. In the embodiment shown, this bottom dead center UT is located by a crankshaft angle KW of $-270°$ before stopping position AP. This first valve closing segment V1 which begins at bottom dead center UT ends in a crankshaft angular range of $-180°$ to $-90°$ before stopping position AP. The way the exact end point V1E of first valve closing segment V1 is determined is described with reference to the function diagram of FIG. 2. In order to determine end V1E of first valve closing segment V1, the rotational speed of the crankshaft is measured as it passes the angular position of $-180°$ before stopping position AP. This second measured value is labeled M2.

The difference between the two measured values M1 and M2 of the rotational speed of the crankshaft is formed in a node V. This difference of the measured values and second measured value M2 are supplied to a first characteristic map KF1, which outputs end point V1E of first valve closing segment V1 as a function of the two aforementioned input quantities. In other words, output signal V1E of first characteristic map KF1 provides the angular position of the crankshaft at which first valve closing segment V1 is to end.

In the function diagram, a threshold value decision SE takes place for first measured value M1 of the crankshaft rotational speed determined at top dead center OT. This threshold value decision SE determines whether first measured value M1 corresponds to a minimum kinetic energy $E_{min}$ or to a maximum kinetic energy $E_{max}$ of the crankshaft motion. These two limit values $E_{min}$ and $E_{max}$ of the kinetic energy after the ignition has been turned off depend on the status of the engine and its accessory units.

As FIG. 1b shows, first valve closing segment V1 of cylinders 1 and 4 is followed by a second valve closing segment V2 of cylinders 2 and 3. This second valve closing segment V2 begins at a crankshaft angular position of $-90°$ before stopping position AP at the earliest and ends in the immediate proximity of gradual stopping position AP at the latest. The exact beginning and the exact end of second valve closing segment V2 are read out from a second characteristic map KF2 and a third characteristic map KF3. The difference between the two measured values M1 and M2 and measured value M2 itself are also supplied as input quantities to these two characteristic maps KF2 and KF3. Second characteristic map KF2 provides beginning V2B and third characteristic map KF3 provides end V2E of second valve closing segment V2 as a function of these quantities. Beginning V2B and end V2E of the second valve closing segment are always understood as crankshaft angular positions with respect to stopping position AP. The output signals of threshold value decision SE are also supplied to second characteristic map KF2 and third characteristic map KF3. If first measured value M1 of the rotational speed of the crankshaft at the time of the first top dead center after the ignition has been turned off corresponds to minimum kinetic energy $E_{min}$, the two characteristic maps KF2 and KF3 suppress the second valve closing segment, so that the valves of cylinders 2 and 3 remain open. In the other extreme case, when first measured value M1 corresponds to upper extreme value $E_{max}$ of the kinetic energy, second characteristic map KF2 gives the crankshaft position of $-90°$ before stopping position AP as beginning V2B of second valve closing segment V2, as FIG. 1b shows. Third characteristic map KF3 provides a crankshaft position in the immediate proximity of stopping position AP as end V2Ee of second valve closing segment V2, as FIG. 1b shows.

There are several interfering factors such as, for example, a friction coefficient which varies with temperature and contamination, as well as aging factors, which prevent the crankshaft from attaining the exact stopping position AP. In order to counteract these factors, it is advantageous to correct the output values of characteristic maps KF1, KF2, and KF3 using correction values K1, K2, and K3. Therefore, as shown in FIG. 2, nodes VP1, VP2, and VP3 are provided, in which the output signals of characteristic maps KF1, KF2, and KF3 are multiplicatively or additively linked to correction values K1, K2, and K3 read out from characteristic curves KL1, KL2, and KL3. Characteristic curves KL1, KL2, and KL3 deliver correction values K1 (for end V1E of first valve closing segment V1), K2 (for beginning V2B of second valve closing segment V2), and K3 (for end V2E of second valve closing segment V2) as a function of engine temperature $T_{mot}$. Characteristic curves KL1, KL2, and KL3 can also take into account the operating time of the engine in addition to engine temperature $T_{mot}$ when forming correction values K1, K2, and K3.

The gradual stopping control was described above using the example of an internal combustion engine having four cylinders. The method can, however, also be used with internal combustion engines having a different number of cylinders, with a different cylinder grouping being used for one, two, or more valve closing segments. While the embodiment described above was based on first valve closing segment V1 having a fixed beginning, namely, a crankshaft angle KW of $-270°$ before stopping position AP, this beginning of first valve closing segment V1 can also be read out as a function of measured values M1 and M2 from a separate characteristic map.

What is claimed is:

1. A method of gradual stopping control of an internal combustion engine, comprising the steps of:

bringing a piston in at least one cylinder of the internal combustion engine into a specific position that corresponds to an angular position of a crankshaft located clearly after a top dead center;

closing a gas exhaust valve of the at least one cylinder for at least one valve closing segment after an ignition has been turned off; and controlling a beginning and an end of each valve closing segment so that the crankshaft remains in a desired stopping position.

2. The method according to claim 1, further comprising the steps of:

after the ignition has been turned off, measuring a first rotational speed value of a rotational speed of the crankshaft after a predefined number of crankshaft revolutions as the crankshaft passes through the top dead center;

closing a gas exchange valve of the at least one cylinder at a subsequent bottom dead center for a first one of the at least one valve closing segment;

measuring again the rotational speed of the crankshaft as the crankshaft passes through a predefined angular position after the bottom dead center in order to produce a second rotational speed value;

determining the end of the first one of the at least one valve closing segment as a function of the first rotational speed value and the second rotational speed value;

if the rotational speed of the crankshaft measured at the top dead center exceeds a minimum value of a kinetic energy, closing a gas exchange valve of at least one additional cylinder for a second one of the at least one valve closing segment; and determining the beginning and the end of the second one of the at least one valve closing segment of the gas exchange valve of the at least one additional cylinder as a function of the first rotational sped value and the second rotational speed value.

3. The method according to claim 2, wherein, as a function of the second rotational speed value and a difference of the first rotational sped value and the second rotational speed value, the method further comprises the steps of:

reading out the end of the first one of the at least one valve closing segment from a first characteristic map;

reading out the beginning of the second one of the at least one valve closing segment from a second characteristic map; and reading out the end of the second one of the at least one valve closing segment from a third characteristic map.

4. The method according to claim 2, further comprising the steps of:

terminating the first one of the at least one valve closing segment at the angular position of the crankshaft of 180° before the desired stopping position if the first rotational speed value corresponds to the minimum value of the kinetic energy; and terminating the first one of the at least one valve closing segment at the angular position of the crankshaft of 90° before the desired stopping position if the first rotational speed value corresponds to a maximum value of the kinetic energy.

5. The method according to claim 2, wherein, if the first rotational speed value corresponds to a maximum value of the kinetic energy, the method further comprises the steps of:

beginning the second one of the at least one valve closing segment in the angular position of the crankshaft of 90° before the desired stopping position; and terminating the second one of the at least one valve closing segment in the angular position in a proximity of the desired stopping position.

6. The method according to claim 3, further comprising the step of:

correcting the beginning and the end of each one of the at least one valve closing segment output by the first characteristic map, the second characteristic map, and the third characteristic map in accordance with correction values taken from characteristic curves as a function of an engine temperature.

* * * * *

UNITED STATES PATENT AND TRADEMARK OFFICE
CERTIFICATE OF CORRECTION

PATENT NO. : 6,647,955 B1
DATED : November 18, 2003
INVENTOR(S) : Udo Sieber

It is certified that error appears in the above-identified patent and that said Letters Patent is hereby corrected as shown below:

<u>Column 5,</u>
Lines 13 and 17, change "sped value" to -- speed value --

Signed and Sealed this

Twenty-second Day of March, 2005

JON W. DUDAS
*Director of the United States Patent and Trademark Office*